Dec. 12, 1933.  E. F. WHITMORE  1,938,947
EGG HANDLING MACHINE
Filed Feb. 8, 1932  4 Sheets-Sheet 1
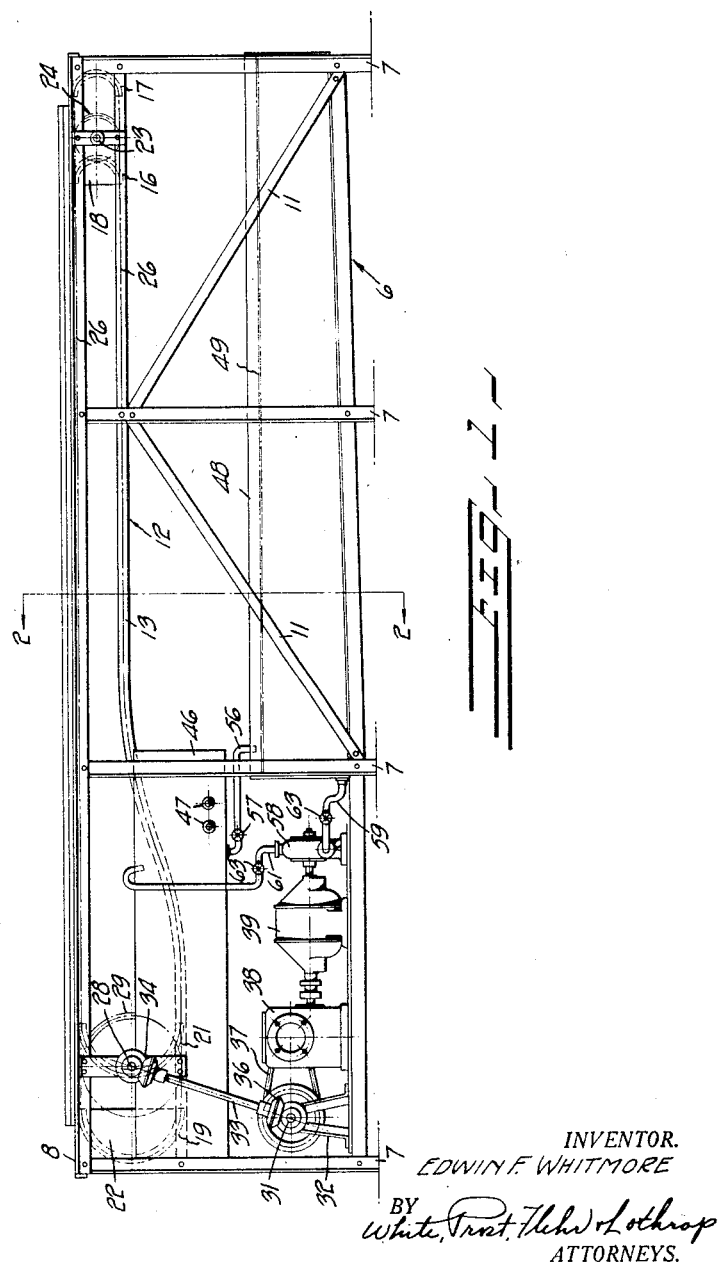
INVENTOR.
EDWIN F. WHITMORE
BY
ATTORNEYS.

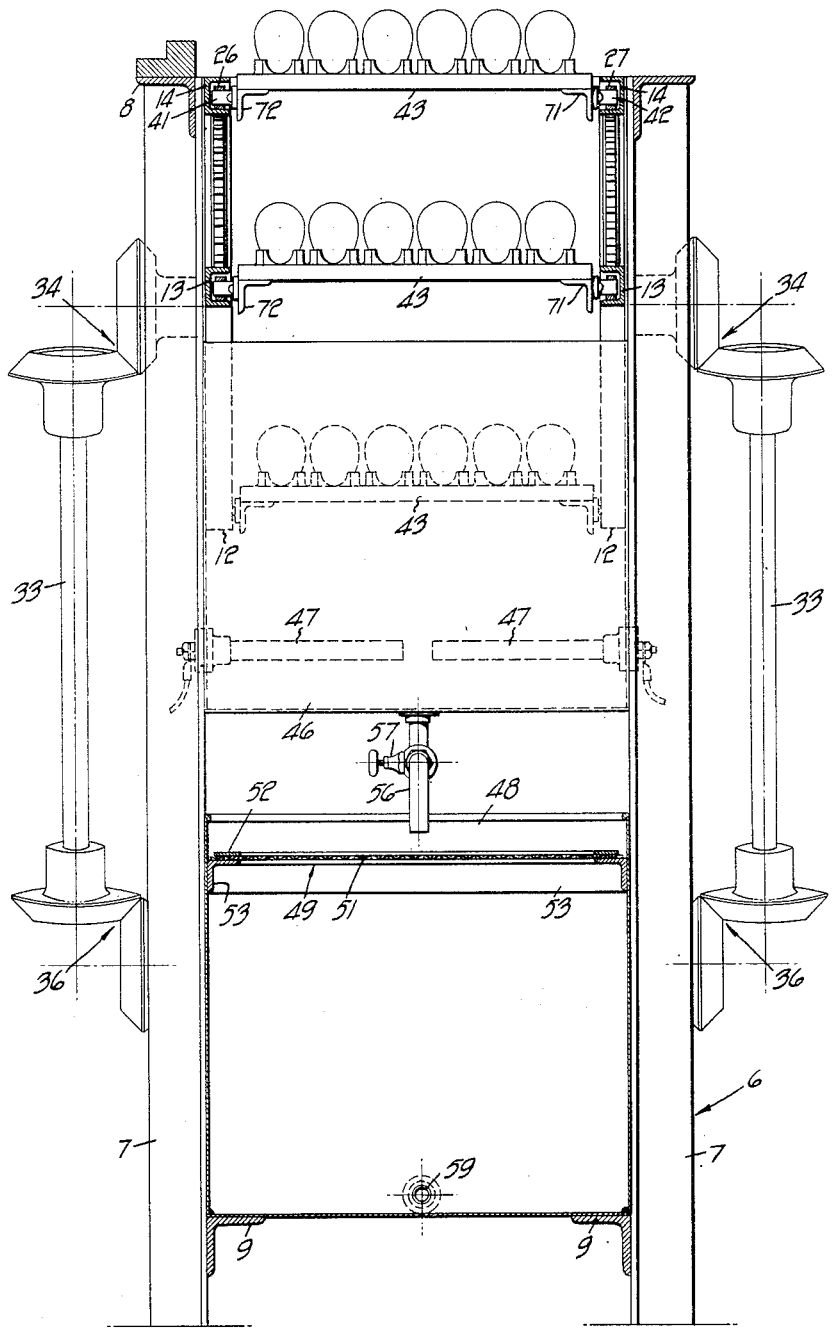

Dec. 12, 1933.   E. F. WHITMORE   1,938,947
EGG HANDLING MACHINE
Filed Feb. 8, 1932   4 Sheets-Sheet 3
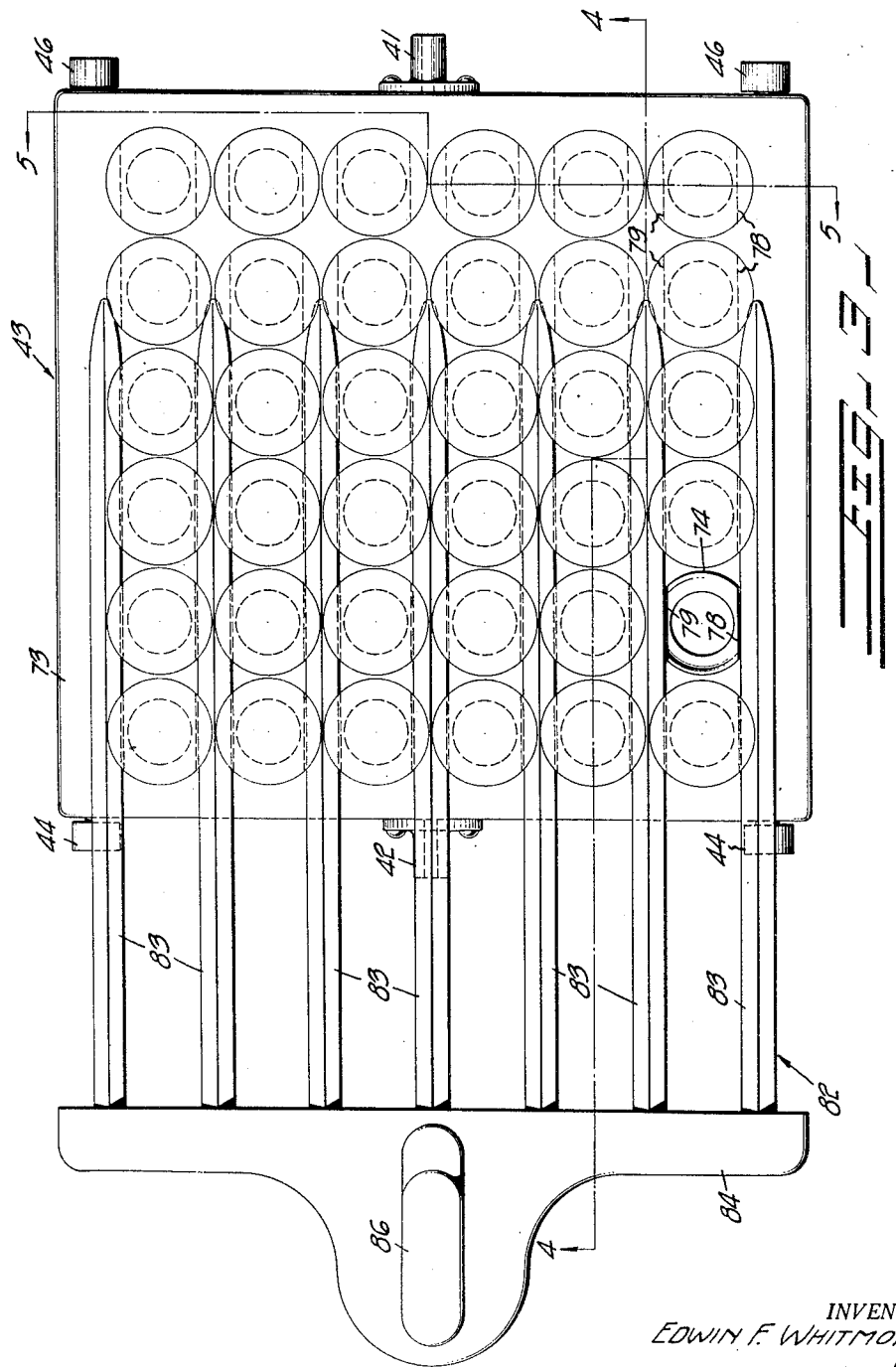
INVENTOR.
EDWIN F. WHITMORE
BY
White, Prost, Hehr & Lothrop
ATTORNEYS.

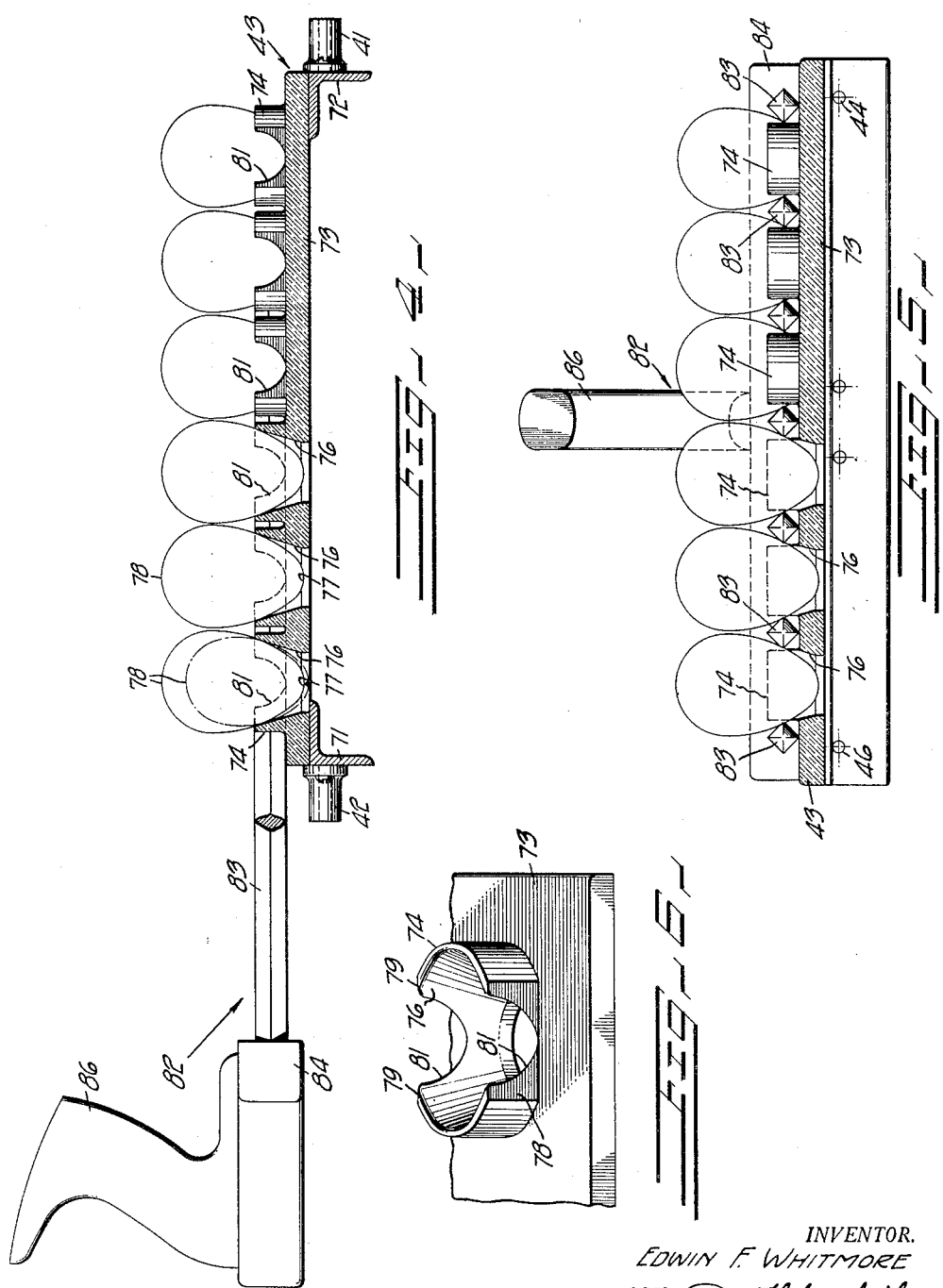

Patented Dec. 12, 1933

1,938,947

UNITED STATES PATENT OFFICE 1,938,947

EGG HANDLING MACHINE

Edwin F. Whitmore, San Francisco, Calif.

Application February 8, 1932. Serial No. 591,585

10 Claims. (Cl. 99—6)

My invention relates to machines for handling large quantities of eggs to be processed, that is, to be coated or covered with a liquid coating such as oil. A machine of this general character is disclosed in my copending application entitled "Egg Processing Machines", filed May 13, 1930, Serial No. 451,946 issued as Pat. #1,925,511, Sept. 5, 1933. This copending application discloses a machine having an endless conveyor traveling through a tank of coating material and carrying egg trays through the tank with means being provided for maintaining the egg trays in a predetermined, substantially horizontal position. It is the usual practice in utilizing egg handling machinery to receive the eggs in units of thirty-six, arranged in the individual cells of a "filler" which is a cardboard framework providing side walls for the cells, but having no top or bottom closure. In an egg crate a plurality of such fillers are superimposed upon each other with "flats", that is, sheets of card or paper, interposed therebetween. After receipt, the eggs are removed from such fillers and are placed on the egg carriers or egg trays of the handling machine, are processed, and are then removed from the carriers or trays and reintroduced into the fillers. The loaded fillers are then returned to the egg crate with flats interposed between successive fillers.

Machines used heretofore provide some sort of mechanism for reintroducing the processed eggs into the fillers. Most such mechanisms act directly upon the eggs themselves for forcing them from the egg trays or carriers into the individual cells of the filler. Some such devices lift the eggs into a superposed filler while others drop the eggs into a subposed filler, but I have found that in all such instances there is a relatively large breakage of eggs, and the mechanism, often complicated, is unsuited to eggs of different size.

It is, therefore, an object of my invention to provide an egg handling machine in which the breakage of eggs is materially reduced.

Another object of my invention is to simplify materially the construction of an egg handling machine.

An additional object of my invention is to construct an egg handling machine having an egg carrying tray which facilitates the placement and removal of eggs.

A further object of my invention is to provide an egg handling machine having an egg carrying tray suitable for carrying eggs of different size.

The foregoing and other objects are attained in the embodiment of the invention shown in the drawings, in which:

Figure 1 is a side elevation of an egg handling machine constructed in accordance with my invention.

Figure 2 is a cross section of my machine on an enlarged scale, the plane of section being indicated by the lines 2—2 of Figure 1.

Figure 3 is a plan of one of the egg trays of the machine of my invention, an egg placing fork being shown partially engaged with the eggs on the tray.

Figure 4 is a cross section, the planes of which are indicated by the lines 4—4 of Figure 3.

Figure 5 is a cross section, the planes of which are indicated by the lines 5—5 of Figure 3.

Figure 6 is a fragmentary view showing in perspective one of the egg holding cups on the egg carrying trays.

In its preferred form, the egg handling machine of my invention comprises a conveyor having egg carrying trays for conducting the eggs to a processing mechanism, the individual trays being provided with cups normally to hold the eggs in a predetermined position, but being also arranged to facilitate the placing and removal of eggs by means of a fork.

In the embodiment of the invention illustrated herein, there is provided a framework 6 conveniently fabricated of structural shapes such as channel and angle iron. The framework comprises a plurality of pairs of uprights 7, to the upper ends of which a pair of out-turned angles 8 are secured and near the lower ends of which a pair of in-turned angles 9 are fastened. Suitable bracing 11 increases the rigidity of the structure. At each side of the framework 6 there is provided a track 12 in its intermediate portions preferably constructed of channels forming a lower run 13 and an upper run 14. Adjacent one end of the framework, the tracks 12 are provided with arcuate branches 16 and 17 on plates 18 while at the other end, the tracks are provided with arcuate branches 19 and 21 of larger radius likewise formed on plates 22. Suitably journaled at one end of the framework 6 are stub shafts 23 carrying sprockets 24 about which chains 26 and 27 are trained while at the other end are provided shafts 28 carrying sprockets 29 encompassed by the chains 26 and 27. The shafts 28 are connected to a lay shaft 31 on a pedestal 32 by a pair of drive shafts 33 and bevel gears 34 and 36. The lay shaft is driven by a chain 37 from a speed reducer 38 coupled to a source of power such as an electric motor 39. When the motor 39 is operated, the chains 26 and 27 are advanced in unison with the sprockets 24 and 29.

Mounted in special links of the chains 26 and 27 are trunnions 41 and 42, disposed in transverse alignment on opposite sides of an egg tray 43, which also carries a pair of pins 44 and 46 at each side for engagement with the tracks 13 and 14. Because of the contour of the tracks and of the branches 16 and 17, and 21 and 22 respectively, the trays are always carried without inversion and in substantially a horizontal position throughout the entire circuit of the conveyor. Adjacent one end of the framework 6 there is provided a tank 46. The contour of the tracks 13 and 14 is such that the trays are lowered into one end of the tank and are lifted on an incline as they are discharged therefrom. The tank is adapted to contain a coating material such as oil which usually is maintained at a temperature above atmospheric and therefore I preferably provide one or more heating elements 47 extending into the tank 46 from points on opposite sides and adjacent the discharge end thereof. This arrangement maintains a body of coating fluid in the tank 46 at substantially a predetermined, uniform temperature throughout, so that eggs carried by the trays are completely immersed and coated with a suitable substance at an appropriate temperature as the trays pass through the tank 46.

After the trays discharge from the tank 46, they continue along the lower run 13 of the conveyor and above a sump or storage tank 48 which is mounted on the framework 6 and extends for the remainder of its length directly below the conveyor in such a fashion that any coating material dropping from the trays is caught. Since such returning material often carries with it feathers, dirt and other undesirable matter, I preferably provide a strainer 49, comprising a sheet of screen or other filtering material 51 held in a suitable frame 52 and supported on brackets 53 to overlie the entire upper surface of the sump tank 48. Undesirable material is retained on the screen 49 which can be periodically removed and cleaned, while the clean coating material passes into the sump tank 48.

Since the excess oil dripping into the sump 48 is cooled materially because of contact with the atmosphere, I prefer not to return such oil continuously to the heated tank 46, but rather permit the oil to remain in the sump tank 48 until the close of the day's run. Since it is desirable to drain the tank 46 at the end of the day's run in order that it may be cleaned, I provide a conduit 56 extending from the bottom of the tank 46 and discharging above the screen 51 into the sump tank 48. This conduit is preferably controlled by a hand valve 57 so that the entire contents of the tank 46 can be drained at will through the screen into the sump tank 48. I provide means for withdrawing oil from the sump or storage tank 48 and discharging it into the heated tank 46 at the beginning of a subsequent run. To this end, there is provided on the shaft of the motor 39 any suitable type of pump 58, the inlet 59 of which communicates with the lowest point in the sump tank 48 and the outlet 61 of which discharges into the upper portion of the tank 46. Hand valves 62 and 63 are provided to control flow through the pump 58.

The egg trays 43 are of peculiar construction and are designed greatly to facilitate the placing and removal of eggs. The members 41 and 42 and the pins 44 and 46 of each egg tray are preferably fastened to a pair of parallel angles 71 and 72 to which is secured a plate 73. The plate 73 is preferably molded of a phenolic condensate compound and is provided with a plurality of cups 74 integrally formed therewith. Customarily the cups are arranged in six rows of six each, making thirty-six in all. The cups interiorly are preferably of conical or approximately conical contour with the apex of the cone downwardly so that there is formed a surface converging toward the bottom of the plate 73. As particularly shown in Figure 4, eggs of different sizes when seated in the cup 74 contact therewith on a circular perimeter of considerably smaller size than the maximum transverse circular perimeter of the eggs, and the inclination or slope of the surface 76 of the cup 74 is such that the lowermost point 77 of different size eggs lies within a relatively narrow zone, while the uppermost point 78 of eggs of different size lies within a relatively wide zone. The cups in any horizontal cross section are substantially circular, but in order to facilitate the positioning of eggs in the cup and to facilitate the withdrawal of eggs therefrom, I preferably extend the exteriorly cylindrical cups upwardly above the upper surface of the plate 73 and cut away opposite sides of each cup on parallel, vertical planes, as at 78 and 79. There are, consequently, two plane surfaces intersecting the opposite sides of the cup to provide on the exterior parallel rectilinear lines of intersection while on the interior providing generally parabolic lines of intersection, such as 81.

There is customarily used in handling eggs, a fork 82, as shown in Figures 3 to 5 inclusive. The fork comprises a plurality of parallel tines 83 usually square in cross section with the diagonals of the cross sectional squares in the same horizontal plane. The tines at one end are sharpened practically to points and at the other end are anchored in a head 84 provided with a suitable handle 86. In placing the eggs on the tray, the fork is inserted underneath a loaded filler in a crate, for instance, and the filler and fork together with the contained eggs are moved as a unit to a position above the tray. The fork and filler with the contained eggs are lowered into position with the tines of the fork between the rows of cups 74, as shown in Figures 3 and 4, and as the fork is withdrawn horizontally the filler is lifted from the eggs so that the eggs rest in the cups 74. After the eggs have completed a cycle or substantially completed a cycle through the handling machine, the fork 82 is horizontally inserted between the rows of cups 74 and lies closely to the surfaces 78 and 79, substantially as shown in Figure 5, the cups 74 acting as guides for the initial insertion of the fork to prevent breakage of the eggs by haphazard manipulation of the fork. When the fork has been fully inserted between the rows, a filler is placed over the top of the eggs which have been held substantially in the predetermined upright position by the cups. The walls of the filler cells therefore fit closely around each egg and the filler is easily pressed down by hand until it nearly contacts the upper edge of the tines of the fork. The filler and fork together with the eggs are then lifted as a unit and are transferred to a packing crate on top of a flat therein. The fork is withdrawn and the filler forced by hand or by weight of a subsequently superposed flat and loaded filler completely home over all of the eggs.

It is to be understood that I do not limit myself to the form of the egg handling machine shown and described herein, as the invention, as set forth in the following claims may be embodied in a plurality of forms.

I claim:

1. An egg handling machine comprising a receptacle adapted to support an egg to be removed therefrom by a fork, said receptacle contacting said egg at points higher than the points of contact of said egg and said fork.

2. An egg handling machine comprising a planar plate having an aperture therethrough, and a pair of arcuate walls defining a circle of lesser diameter than that of an egg to be supported thereby, said walls partially bounding said aperture and projecting from the plane of said plate.

3. An egg handling machine comprising a plate, and a pair of opposed, arcuate walls projecting above said plate, said walls being of a size such as entirely to underlie an egg supported thereby.

4. An egg handling machine comprising a base, and a pair of supporting means extending upwardly from said base to contact opposite exterior portions of an egg leaving free intermediate exterior portions of said egg to be contacted by adjacent parallel tines of a fork coplanar with said means.

5. An egg handling machine comprising a plate, an alined series of egg receptacles having walls projecting above said plate, the walls of each of said receptacles being sufficiently cut away on opposite sides on planes common to all of said receptacles to permit adjacent, parallel tines on a fork coplanar with said receptacle substantially simultaneously to contact eggs in said receptacles.

6. An egg handling machine comprising a receptacle adapted to support an egg to be removed therefrom by a fork contacting said egg at diametrically opposite points, said receptacle contacting said egg only at diametrically opposite regions between said points.

7. An egg handling machine comprising a receptacle having oppositely disposed portions contacting an egg in said receptacle, said portions terminating to leave opposite spaces therebetween into which said egg projects.

8. An egg handling machine comprising a receptacle adapted to support an egg, said receptacle including an annular wall having opposite portions cut away sufficiently to permit said egg to project therethrough.

9. An egg handling machine for use with a fork having tines adapted to support an egg at two opposite points on the periphery thereof comprising a receptacle adapted to extend between said tines and support said egg at two regions on the periphery thereof intermediate said points.

10. An egg handling machine for use with a fork having parallel tines spaced apart a predetermined distance comprising a circular wall of greater diameter than said distance, said wall being cut away on opposite sides to extend between said tines.

EDWIN F. WHITMORE.